(12) United States Patent
Fukushima et al.

(10) Patent No.: US 12,413,265 B2
(45) Date of Patent: Sep. 9, 2025

(54) COMMUNICATION DEVICE

(71) Applicant: Mitsubishi Electric Corporation, Tokyo (JP)

(72) Inventors: Toshiaki Fukushima, Tokyo (JP); Shigeru Sumi, Tokyo (JP); Tetsuya Takashima, Tokyo (JP); Koji Noda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/875,562

(22) PCT Filed: Dec. 1, 2022

(86) PCT No.: PCT/JP2022/044445
§ 371 (c)(1),
(2) Date: Dec. 16, 2024

(87) PCT Pub. No.: WO2024/116386
PCT Pub. Date: Jun. 6, 2024

(65) Prior Publication Data
US 2025/0175212 A1 May 29, 2025

(51) Int. Cl.
*H04B 5/24* (2024.01)
(52) U.S. Cl.
CPC ..................... *H04B 5/24* (2024.01)
(58) Field of Classification Search
CPC ... H04B 5/79; H04B 5/72; H04B 5/26; H04B 5/266; H04B 5/263; H04B 1/44; H04B 5/48; H04B 5/24; H04B 7/0404; H04B 1/005; H04B 1/40; H04B 7/0686; H04B 7/0413; H04B 1/006; H04B 1/401
(Continued)

(56) References Cited

U.S. PATENT DOCUMENTS

2008/0191226 A1* 8/2008 Urashima ............ H10H 20/819
257/E33.068
2018/0254552 A1 9/2018 Ito
(Continued)

FOREIGN PATENT DOCUMENTS

CN 203056103 U 7/2013
CN 110417953 A 11/2019
(Continued)

OTHER PUBLICATIONS

International Search Report and Written Opinion mailed on Feb. 21, 2023, received for PCT Application PCT/JP2022/044445, filed on Dec. 1, 2022, 11 pages including English Translation.
(Continued)

*Primary Examiner* — Ajibola A Akinyemi
(74) *Attorney, Agent, or Firm* — XSENSUS LLP

(57) ABSTRACT

A communication device includes a body, and a wireless communicator housed in the body for communicating wirelessly with an external device proximate to the body through magnetic coupling. The body is placed in an opening in a wall surface and fixed to the wall surface with an exposed surface of the body exposed from the wall surface. The wireless communicator includes a substrate including a coil pattern to allow the magnetic coupling with the external device. The substrate is nonparallel to the exposed surface.

11 Claims, 23 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 2018/0323499 A1 | 11/2018 | Navarro Pérez et al. | |
| 2019/0341692 A1* | 11/2019 | Kubo | G06K 7/10 |
| 2022/0123786 A1* | 4/2022 | Partovi | H01F 38/14 |

FOREIGN PATENT DOCUMENTS

| | | | |
|---|---|---|---|
| DE | 102011100036 A1 | 10/2012 | |
| JP | 2011-091503 A | 5/2011 | |
| JP | 2015-008375 A | 1/2015 | |
| JP | 2015080147 A | 4/2015 | |
| JP | 2019-008596 A | 1/2019 | |
| WO | 2017/094355 A1 | 6/2017 | |

OTHER PUBLICATIONS

Decision to Grant mailed on Jul. 25, 2023, received for JP Application 2023-523193, 5 pages including English Translation.
Office Action dated May 20, 2025, issued for the corresponding German patent application No. 112022007206.7 (10 pages; with English machine translation).
Office Action dated Jun. 18, 2025, issued for the corresponding Chinese patent application No. 202280097670.2 (21 pages; with English translation).

\* cited by examiner

COMMUNICATION DEVICE

CROSS-REFERENCE TO RELATED APPLICATION

This application is a national stage application, pursuant to 35 U.S.C. § 371, of International Patent Application No. PCT/JP2022/044445, filed Dec. 1, 2022, the entire contents of which are incorporated herein by reference.

TECHNICAL FIELD

The present disclosure relates to a communication device.

BACKGROUND ART

In known equipment such as a control panel used at a factory automation (FA) site, a device may be installed to provide additional functions such as a user interface. When the device installed in the equipment can wirelessly communicate with a mobile terminal such as a smartphone or a tablet terminal, the equipment is more convenient, allowing easy data input or output by the operator.

For equipment users to easily install and use the device without complicated preliminary work such as network setting, the device installable in the equipment may perform short-range wireless communication with a mobile terminal. To achieve this, short-range wireless communication techniques may be applied to the device installable in the equipment (see, for example, Patent Literature 1).

CITATION LIST

Patent Literature

Patent Literature 1: Unexamined Japanese Patent Application Publication No. 2011-091503

SUMMARY OF INVENTION

Technical Problem

Patent Literature 1 describes a digital camera including an antenna that performs short-range wireless communication when an antenna in another device is proximate to the camera. Such a digital camera can be approached by another device from above, below, right, left, front, and rear and thus have a high degree of flexibility in the installation of the antenna.

However, the device installed in the equipment is typically embedded in and integral with the equipment except a surface for providing the functions of the device, thus performing short-range wireless communication through the surface. When a flat antenna is incorporated to face the antenna of another device as described in Patent Literature 1, the surface of the device installable in the equipment is to have a large area corresponding to at least the area of the antenna. This may increase the size of the device when the function of short-range wireless communication is implemented in the device installable in the equipment.

Under such circumstances, an objective of the present disclosure is to allow a device installable in equipment to implement short-range wireless communication without increasing the size of the device.

Solution to Problem

To achieve the above objective, a communication device according to an aspect of the present disclosure includes a body, and wireless communication means housed in the body for communicating wirelessly with an external device proximate to the body through magnetic coupling. The body is placed in an opening in a wall surface and fixed to the wall surface with an exposed surface of the body exposed from the wall surface. The wireless communication means includes a substrate including a coil pattern to allow the magnetic coupling with the external device. The substrate is nonparallel to the exposed surface.

Advantageous Effects of Invention

In the structure according to the above aspect of the present disclosure, the exposed surface is nonparallel to the substrate including the coil pattern. The region to be used for wireless communication in the exposed surface is thus smaller than the area of the substrate. This allows a device installable in equipment to implement short-range wireless communication without increasing the size of the device.

DESCRIPTION OF EMBODIMENTS

Figure 1:
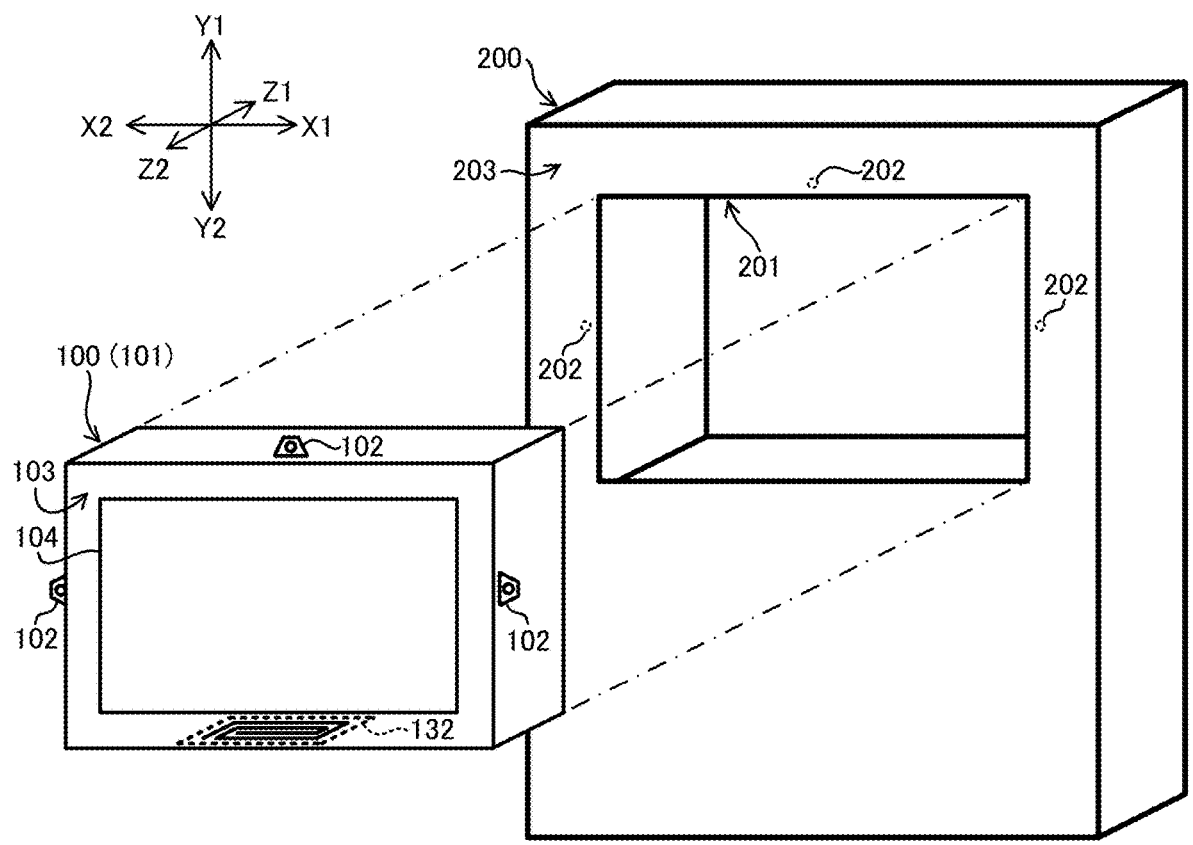
FIG. 1 is an external view of a communication device according to Embodiment 1.

A communication device according to one or more embodiments of the present disclosure is described below in detail with reference to the drawings. An arrow Z1 indicates a direction in which the communication device is placed in equipment, and an arrow Z2 indicates the direction opposite to the arrow Z1 in the drawings. Arrows X1, X2, Y1, and Y2 each indicate a direction perpendicular to the arrows Z1 and Z2. The one or more embodiments are described focusing on examples in which the arrows X1 and X2 point horizontally and the arrows Y1 and Y2 point vertically. The exposed surface of the communication device installed in the equipment corresponds to a plane X-Y.

Embodiment 1

As illustrated in FIG. 1, a communication device 100 according to the present embodiment is a display installed in equipment 200 that is a control panel. The communication device 100 functions as a user interface for the equipment 200. The communication device 100 includes a body 101 that provides the user interface function of the communication device 100, attachments 102 that fix the body 101 to the equipment 200, and an exposed surface 103 fixed to the equipment 200 to face outside the equipment 200.

The communication device 100 is installed in the equipment 200 with the body 101 placed along the arrow Z1 into an opening 201 in a wall surface 203 of the equipment 200. The surface of the communication device 100 opposite to the exposed surface 103 is placed first into the opening 201. The attachments 102 are then fastened to holes 202 near inner wall surfaces of the equipment 200 with screws (not illustrated). Although FIG. 1 illustrates the attachments 102 as metal fittings each with a threaded hole, the attachments 102 may be metal fitting holders to which such metal fittings are attachable after the body 101 is placed in the opening 201. The body 101 is placed in the opening 201 in the wall surface 203 and fixed to the wall surface 203 with the exposed surface 103 being a surface of the body 101 in the Z2 direction exposed from the wall surface 203. The exposed surface 103 includes a display screen 104 that displays an image for an operator who operates the equipment 200.

Figure 2:
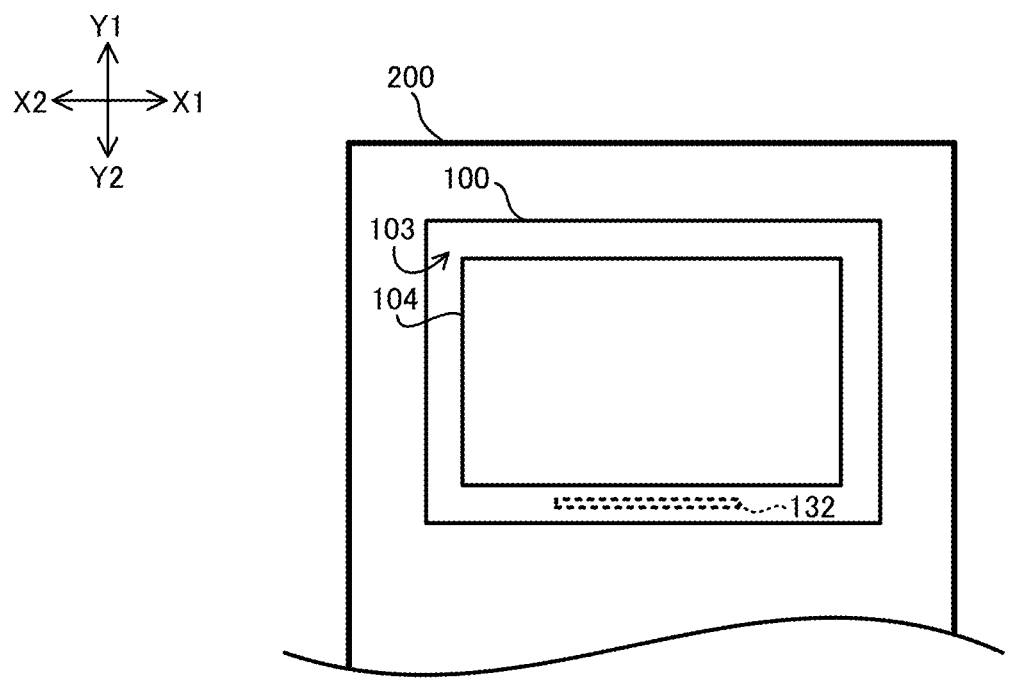
FIG. 2 is a diagram of the communication device according to Embodiment 1 installed in equipment.

In the communication device 100, a substrate 132 including a coil pattern that functions as an antenna for short-range wireless communication is placed to be parallel to a plane X-Z. FIG. 2 illustrates the communication device 100 installed in the equipment 200 and integral with the equipment 200. As illustrated in FIG. 2, the exposed surface 103 includes the display screen 104 and a frame for the display screen 104.

The communication device 100 is a display that functions mainly as a user interface. The display screen 104 that provides the function may thus use a large proportion of the exposed surface 103 with the frame being small. The operator places a mobile terminal proximate to the substrate 132 located inside the frame for data input or output through short-range wireless communication.

Figure 3:
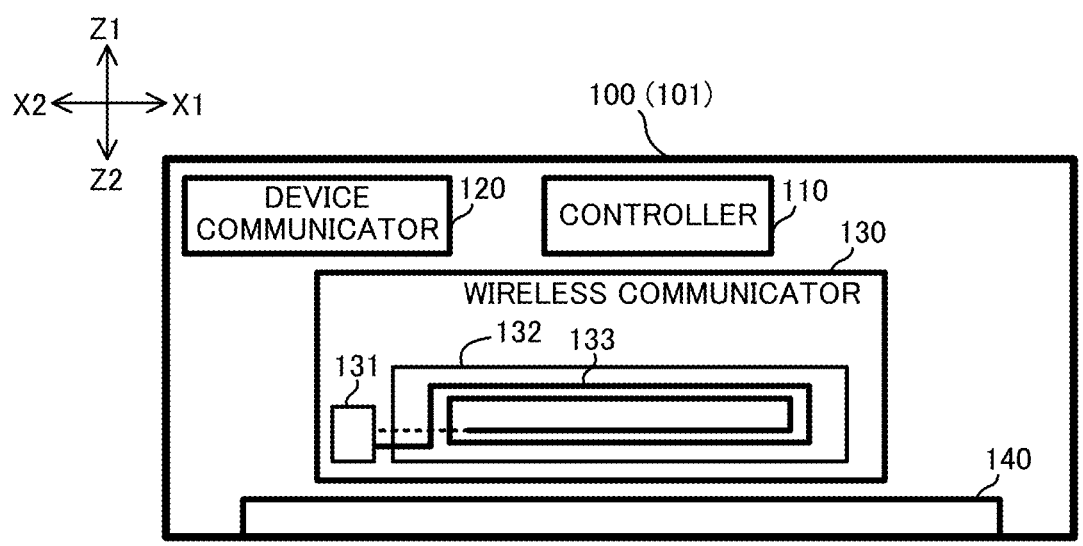
FIG. 3 is a block diagram of a body in Embodiment 1.

FIG. 3 is a block diagram of the body 101. As illustrated in FIG. 3, the body 101 includes a controller 110 that controls the components of the body 101, a device communicator 120 that communicates with the equipment 200, a wireless communicator 130 that performs short-range wireless communication with an external device, and a display 140 that displays an image on the display screen 104. The display screen 104 corresponds to an example of a screen on which an image appears, and the display 140 corresponds to an example of display means for displaying an image on the screen in the exposed surface.

The device communicator 120 may be connected to the equipment 200 with a cable for wired communication with the equipment 200 or perform wireless communication with the equipment 200.

The controller 110 includes a central processing unit (CPU) or a micro processing unit (MPU) and memories such as a random-access memory (RAM) and a read-only memory (ROM). The controller 110 executes a program stored in such memories to control the device communicator 120, the wireless communicator 130, and the display 140.

More specifically, the controller 110 functions as an input interface for the communication device 100 by providing the operator's operation on a touchscreen of the display 140 or the results of processing the operation to the equipment 200 through the device communicator 120. The controller 110 also functions as an output interface for the communication device 100 by producing an image based on a signal received from the equipment 200 through the device communicator 120 and displaying the image on the display 140. The controller 110 further processes data received from an external device through the wireless communicator 130 or transmits data to the external device through the wireless communicator 130.

The wireless communicator 130 corresponds to an example of wireless communication means housed in the body 101 for communicating wirelessly with an external device proximate to the exposed surface 103 of the body 101 through magnetic coupling. The wireless communicator 130 includes a communication circuit 131 including a communication interface circuit and the substrate 132 including a coil pattern 133 to allow the magnetic coupling with the external device. The coil pattern 133 includes a conductor indicated by a solid line in FIG. 3 and printed on the front surface of the substrate 132 that is a rigid substrate, and a conductor indicated by a dashed line and printed on the rear surface of the substrate 132. These conductors are electrically connected together with a through-hole or with a conductor extending through an insulator layer in the substrate. The coil pattern 133 thus forms a coil and functions as an inductor. The communication circuit 131 transmits and receives data to and from the external device through magnetic coupling between the coil pattern 133 and a coil included in the external device.

Figure 4:
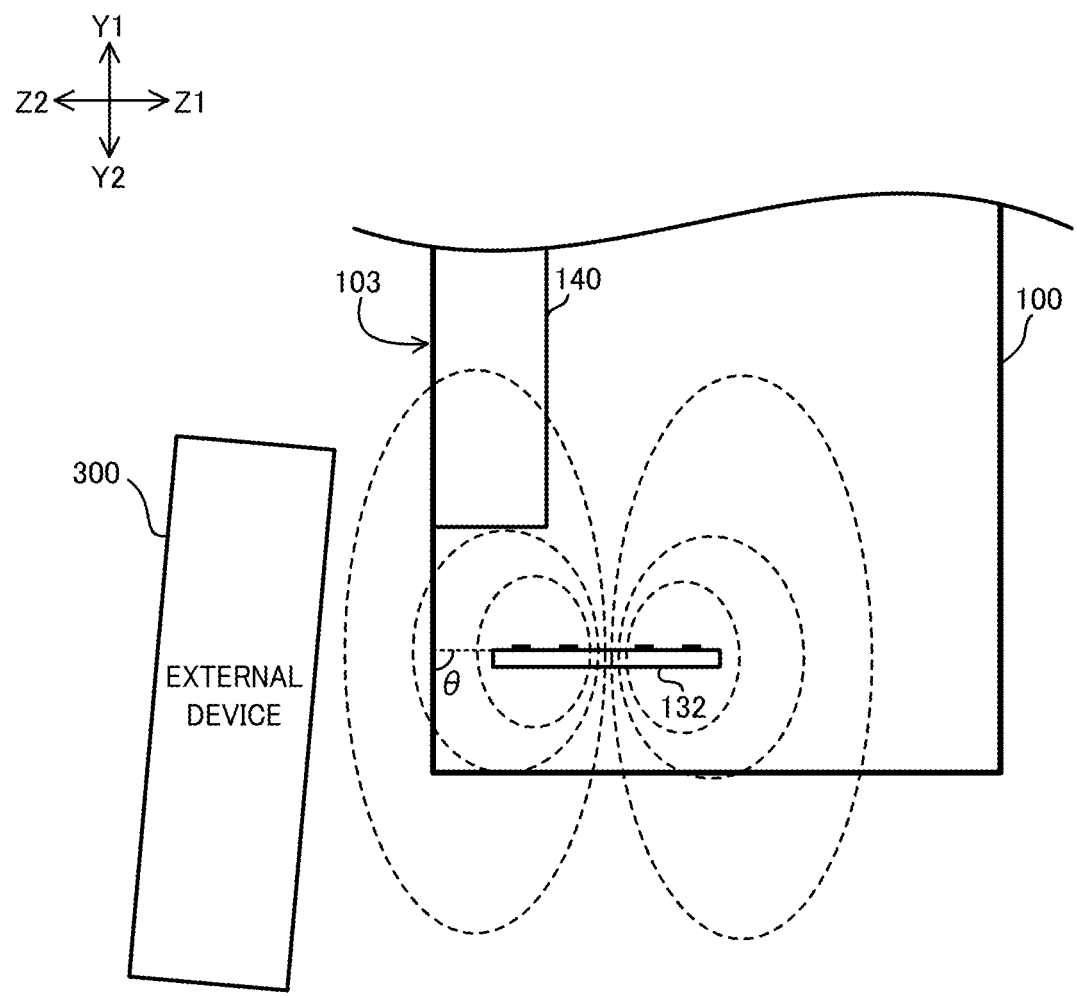
FIG. 4 is a schematic diagram of a magnetic field generated by a coil pattern in Embodiment 1.

With the substrate 132 placed to be parallel to the plane X-Z as described above, a current flowing in the coil pattern 133 generates a magnetic field as indicated by dashed lines in FIG. 4. Although the magnetic flux density produced by a coil usually has a large value at the central axis of the coil, a fringe magnetic field extends to an external device 300 located in the Z2 direction as illustrated in FIG. 4, thus allowing communication with the coil pattern 133 used as an antenna.

The magnetic field produced from an antenna in the external device 300 also induces a current although the current is weaker than a current generated when substrates including antennas face each other, thus allowing the wireless communicator 130 to receive data from the external device 300. When the central axis of the coil serving as the antenna in the external device 300 is aligned with the substrate 132, almost no current is induced. In this case, a message may be displayed on the display 140 to prompt the operator to adjust the position or orientation of the external device 300.

Figure 5:
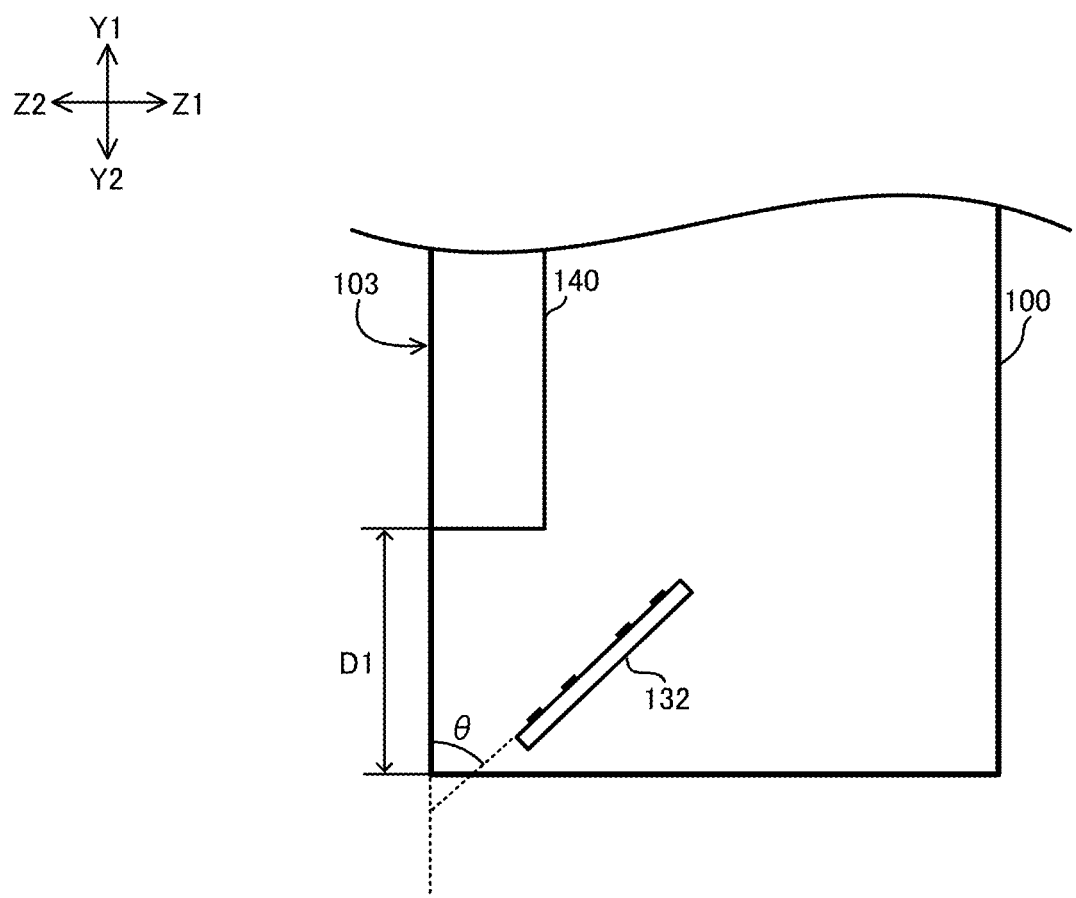
FIG. 5 is a diagram of a substrate in Embodiment 1 inclined with respect to an exposed surface.

In this example, the substrate 132 described above is parallel to the plane X-Z, or more specifically, the substrate 132 is perpendicular to the exposed surface 103, with the substrate 132 forming an angle θ of 90 degrees with the exposed surface 103. However, the present disclosure is not limited to the example. As illustrated in FIG. 5, the angle θ may be greater than 0 degrees and less than 90 degrees. In other words, the substrate 132 and the exposed surface 103 are to be nonparallel. As illustrated in FIG. 5, the angle θ between the substrate 132 and the exposed surface 103 may be the angle between the extended plane of the substrate 132 and the extended plane of the exposed surface 103. As illustrated in FIGS. 4 and 5, the angle θ may be equal to an acute angle between the substrate 132 and the exposed surface 103.

Figure 6:
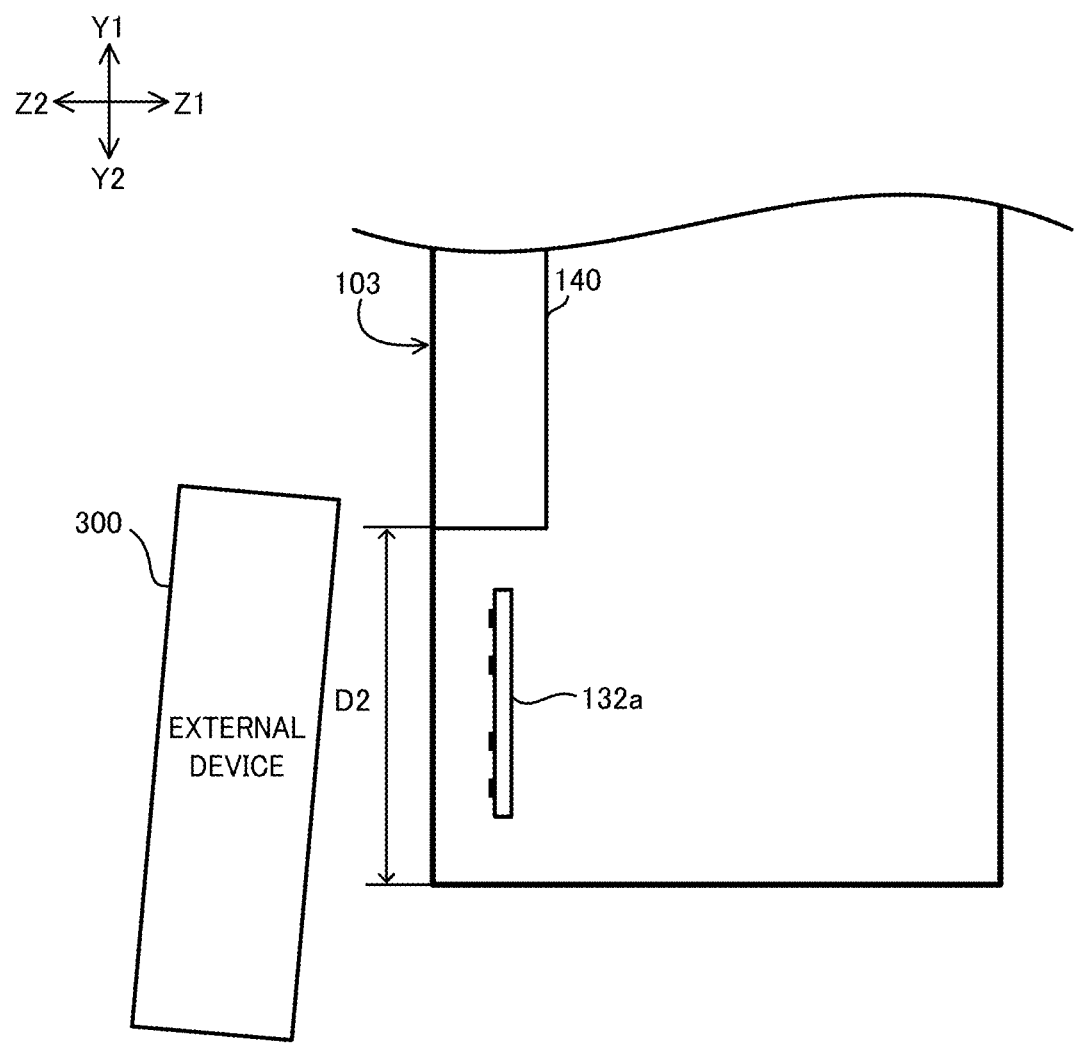
FIG. 6 is a diagram illustrating a frame including a substrate in a comparative example.

As described above, the exposed surface 103 is nonparallel to the substrate 132 including the coil pattern 133 as the antenna. In the exposed surface 103, the region to be used for wireless communication is thus smaller than the area of the substrate. For example, a width D1 of the frame surrounding the display screen in the exposed surface 103 illustrated in FIG. 5 is smaller than a width D2 of a frame on an exposed surface 103 parallel to a substrate 132a illustrated as a comparative example in FIG. 6. This allows the function of short-range wireless communication to be implemented in the communication device 100 installable in the equipment 200 without increasing the size of the communication device 100.

In particular, when the angle θ is 60 degrees or more, the region to be used in the exposed surface 103 may be equal to or less than half of the area of the substrate 132. More specifically, when the angle θ is 85 degrees or more, the region to be used in the exposed surface 103 may be equal to or less than 10% of the area of the substrate 132.

Although the coil pattern 133 described above includes two windings, the coil pattern 133 may include a single winding or two or more windings.

Embodiment 2

Embodiment 2 is described focusing on the differences from Embodiment 1 described above. Like reference signs denote like or corresponding components in Embodiment 1. The present embodiment differs from Embodiment 1 in that the coil pattern 133 includes multiple coil patterns with different center points.

Figure 7:
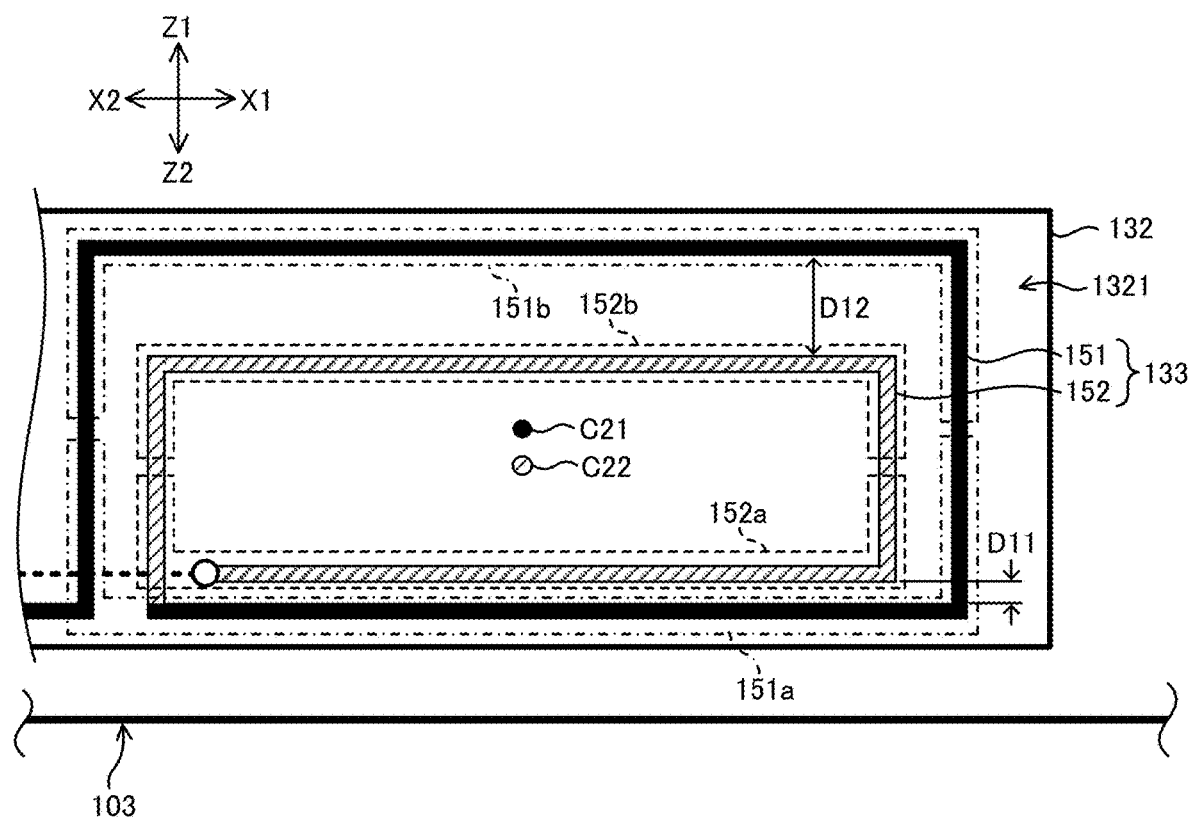
FIG. 7 is a diagram illustrating a coil pattern in Embodiment 2.

As illustrated in FIG. 7, the coil pattern 133 includes a first coil pattern 151 indicated by a solid area and a second coil pattern 152 indicated by a hatched area. The first coil pattern 151 and the second coil pattern 152 each include a single winding, and the coil pattern 133 corresponds to a coil with two windings. The first coil pattern 151 and the second coil pattern 152 are located on the same surface 1321 of the substrate 132, with the first coil pattern 151 located outward from the second coil pattern 152.

The second coil pattern 152 has a center point C22 closer to the exposed surface 103 than a center point C21 of the first coil pattern 151. The center points C21 and C22 may be the gravity centers of the first coil pattern 151 and the second coil pattern 152 or the points at which the magnetic flux density is greatest when a current flows in each of the first coil pattern 151 and the second coil pattern 152 on the surface 1321 of the substrate 132 including the first coil pattern 151 and the second coil pattern 152.

The first coil pattern 151 includes a first conductor 151a adjacent to the exposed surface 103 and a second conductor 151b opposite to the exposed surface 103 across the first conductor 151a. The second coil pattern 152 includes a third conductor 152a adjacent to the exposed surface 103 and a fourth conductor 152b opposite to the exposed surface 103 across the third conductor 152a. A distance D11 between the first conductor 151a and the third conductor 152a is smaller than a distance D12 between the second conductor 151b and the fourth conductor 152b.

Figure 8:
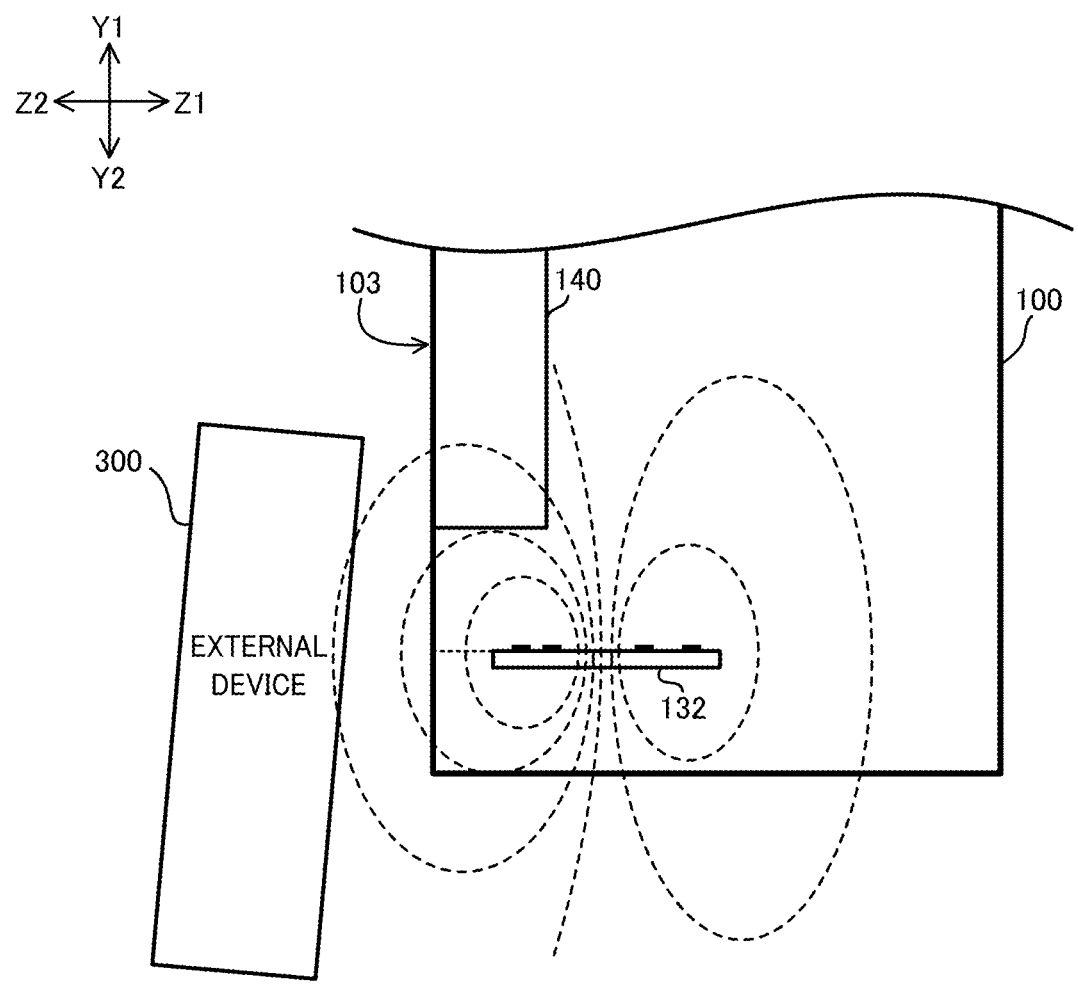
FIG. 8 is a schematic diagram of a magnetic field generated by the coil pattern in Embodiment 2.

In the conductor patterns in the coil pattern 133 in the present embodiment, the conductor patterns adjacent to the exposed surface 103 are closer to each other as illustrated in FIG. 8. This may increase the surrounding magnetic flux density, thus improving the efficiency of short-range wireless communication with the external device 300.

Figure 9:
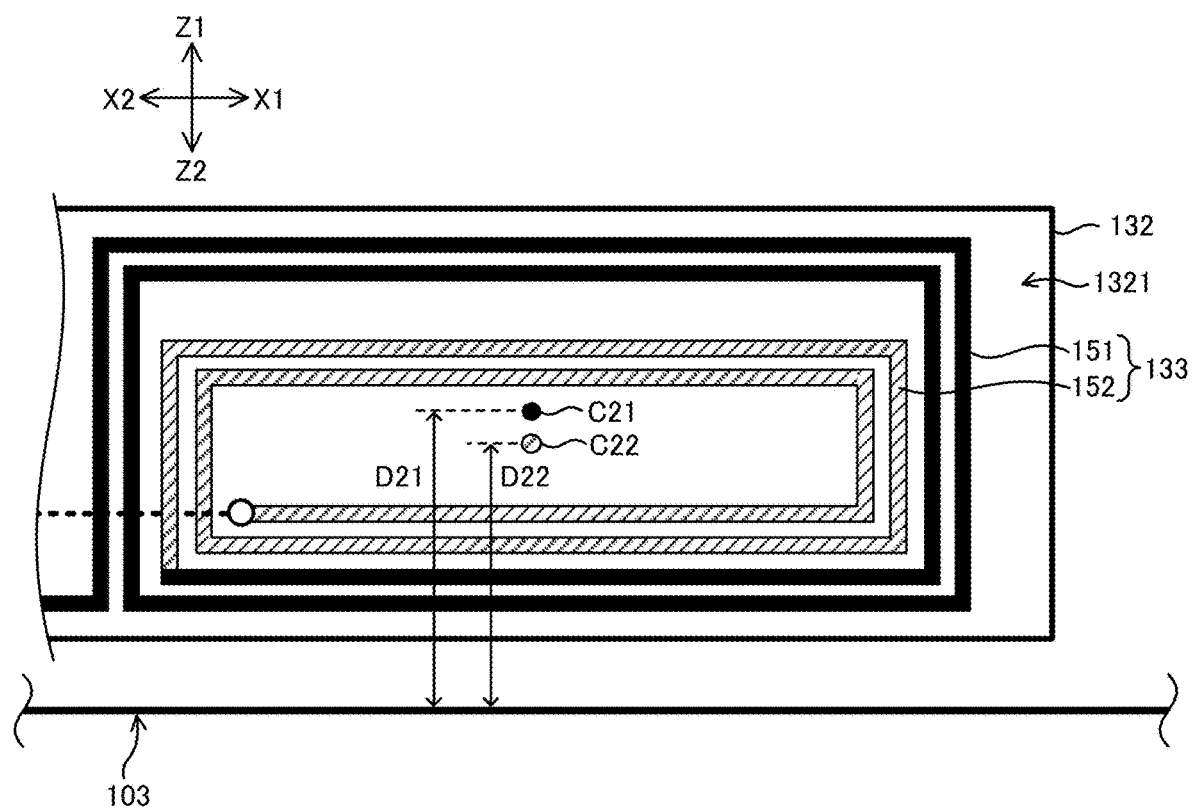
FIG. 9 is a first diagram illustrating a coil pattern in a modification.

Although the first coil pattern 151 and the second coil pattern 152 described above each include a single winding, at least one of the first coil pattern 151 or the second coil pattern 152 may include two or more windings. FIG. 9 illustrates a coil pattern 133 including a first coil pattern 151 and a second coil pattern 152 each including two windings. For the first coil pattern 151 and the second coil pattern 152 with any number of windings, a distance D22 between the exposed surface 103 and the center point C22 of the second coil pattern 152 is to be smaller than a distance D21 between the exposed surface 103 and the center point C21 of the first coil pattern 151. For the first coil pattern 151 located inward with the second coil pattern 152 located outward, the distance D21 is to be smaller than the distance D22. The coil pattern 133 may include the first coil pattern 151 and the second coil pattern 152 with the distance D21 different from the distance D22. The distance D21 corresponds to an example of a first distance between an exposed surface and the center of a first coil pattern. The distance D22 corresponds to an example of a second distance between the exposed surface and the center of a second coil pattern.

Embodiment 3

Embodiment 3 is described focusing on the differences from Embodiment 1. Like reference signs denote like or corresponding components in Embodiment 1. The present embodiment differs from Embodiment 1 in that the coil pattern 133 includes multiple coil patterns located on different layers in the substrate 132.

Figure 10:
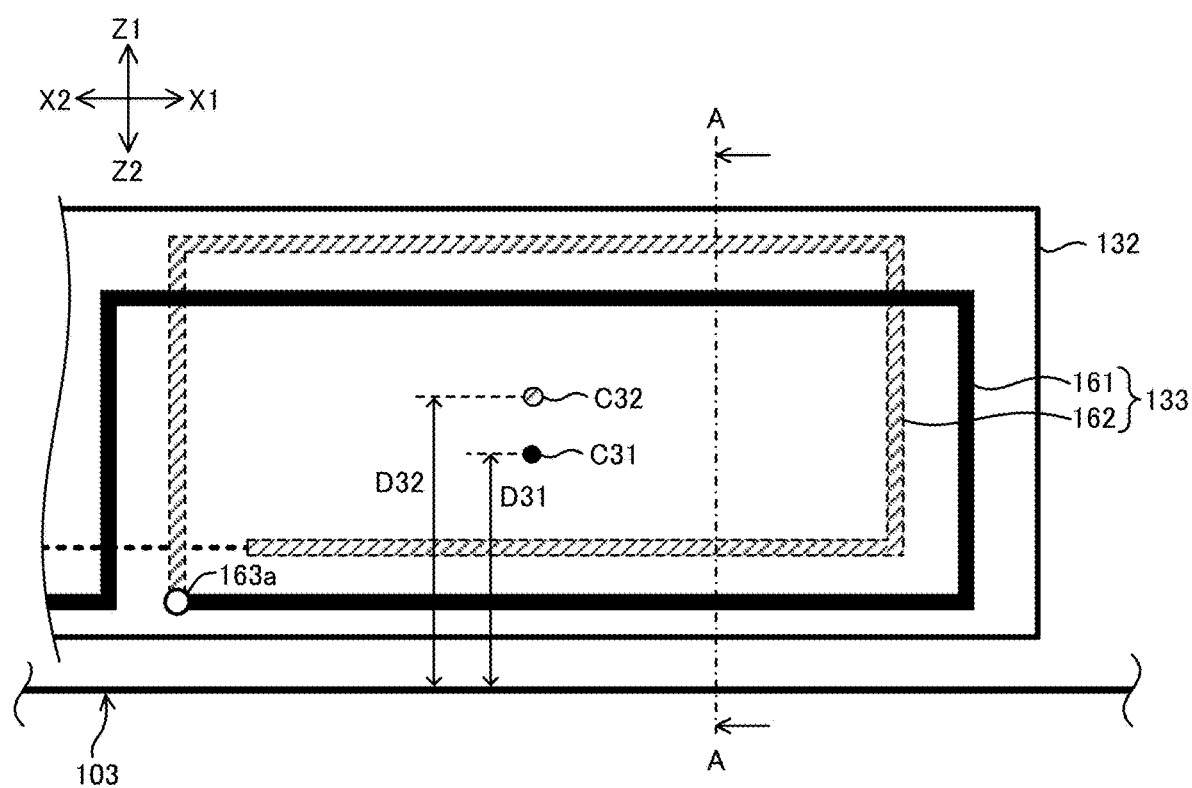
FIG. 10 is a diagram illustrating a coil pattern in Embodiment 3.

As illustrated in FIG. 10, the coil pattern 133 includes a first coil pattern 161 indicated by a solid area and a second coil pattern 162 indicated by a hatched area. The first coil pattern 161 is located on the front surface of the substrate 132 in the Y1 direction. The second coil pattern 162 is located on the rear surface of the substrate 132 in the Y2 direction and is electrically connected to the first coil pattern 161 with an electrical conductor 163a that is a through-hole conductor or a via conductor. The first coil pattern 161 and the second coil pattern 162 each include a single winding, and the coil pattern 133 corresponds to a coil with two windings.

The first coil pattern 161 has a center point C31 closer to the exposed surface 103 than a center point C32 of the second coil pattern 162. More specifically, a distance D31 between the exposed surface 103 and the center point C31 is smaller than a distance D32 between the exposed surface 103 and the center point C32. The center points C31 and C32 may be defined in the same manner as the center points C21 and C22 in Embodiment 2.

Figure 11:
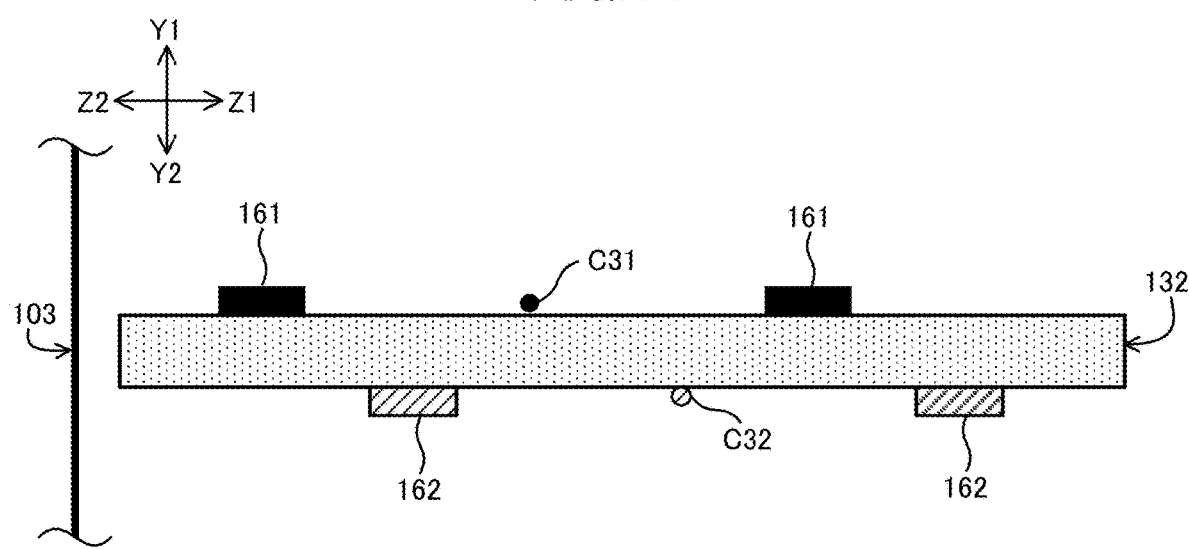
FIG. 11 is a schematic cross-sectional view of a substrate in Embodiment 3.

FIG. 11 is a schematic cross-sectional view of the substrate 132 taken along line A-A. As illustrated in FIG. 11, the first coil pattern 161 is located on the conductor layer at the front surface of the substrate 132, and the second coil pattern 162 is located on the conductor layer at the rear surface of the substrate 132. As illustrated in FIG. 11, the coil corresponding to the coil pattern 133 including the first coil pattern 161 and the second coil pattern 162 is inclined with respect to the substrate 132.

Figure 12:
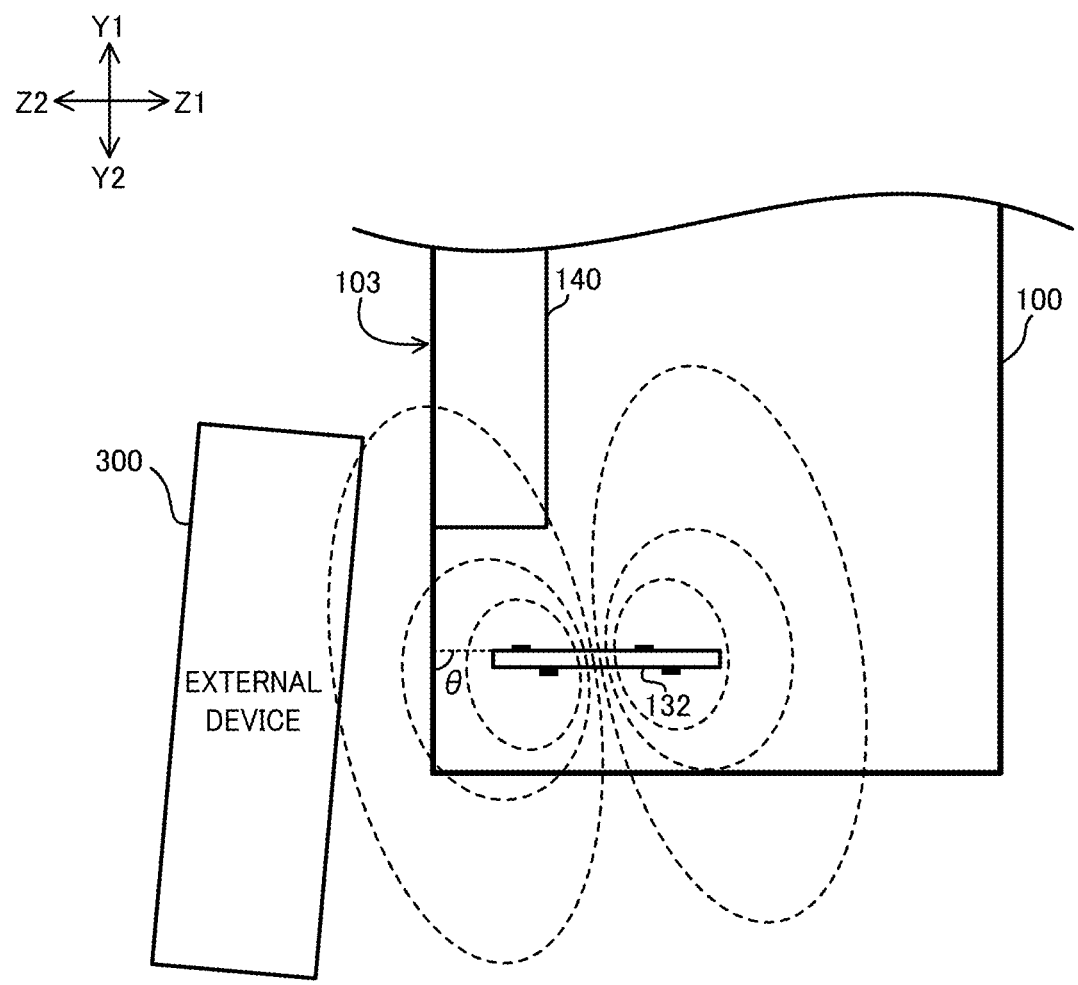
FIG. 12 is a schematic diagram of a magnetic field generated by the coil pattern in Embodiment 3.

In the communication device 100 including the coil pattern 133 according to the present embodiment, the central axis of the coil pattern 133 is inclined with respect to a Y-axis although the substrate 132 and the exposed surface 103 form an angle θ of 90 degrees as illustrated in FIG. 12. The magnetic flux density value is thus expected to be greater at the position of the external device 300. This may improve the efficiency of communication with the external device 300.

Figure 13:
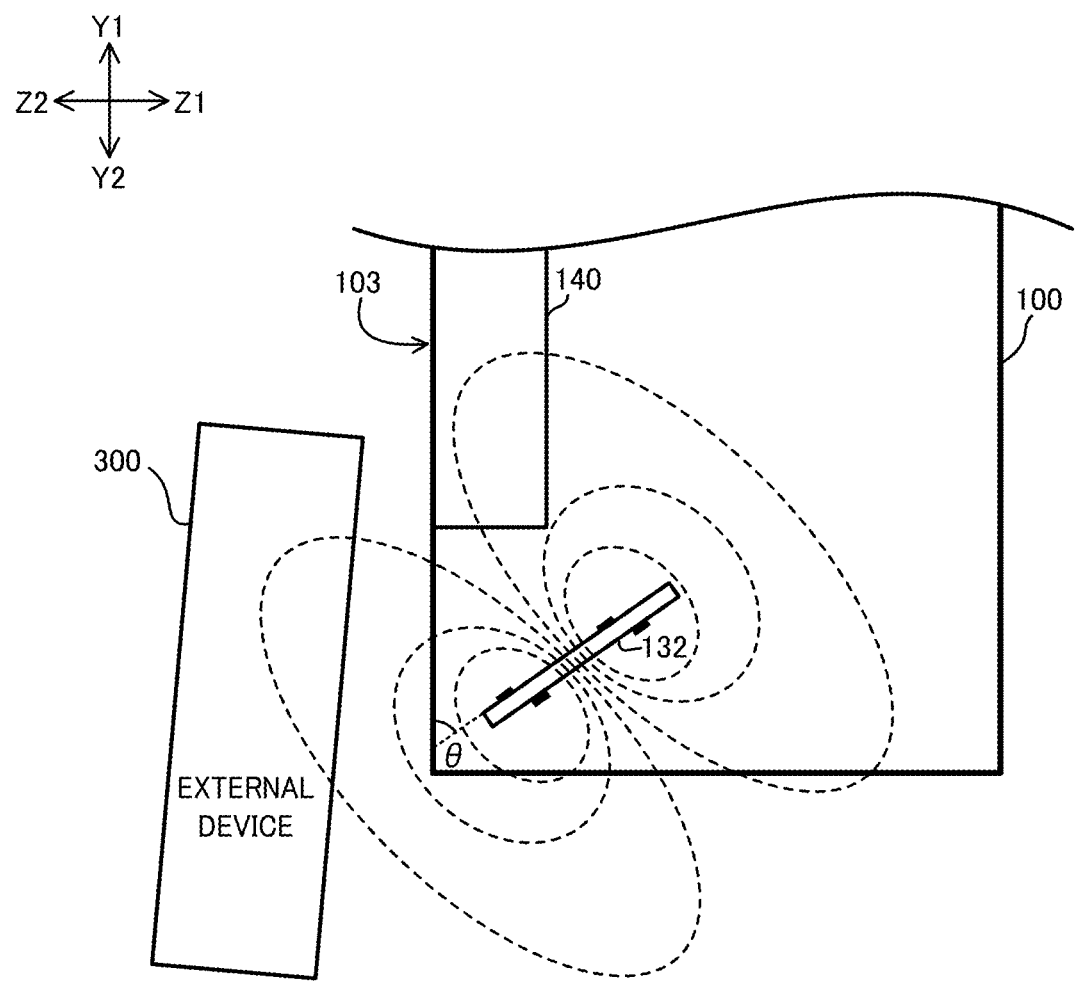
FIG. 13 is a schematic diagram of a generated magnetic field in a modification.

When the angle θ is less than 90 degrees as illustrated in FIG. 13, the central axis of the coil comes more proximate to a Z-axis, and the efficiency of communication with the external device 300 is expected to be improved further.

Figure 14:
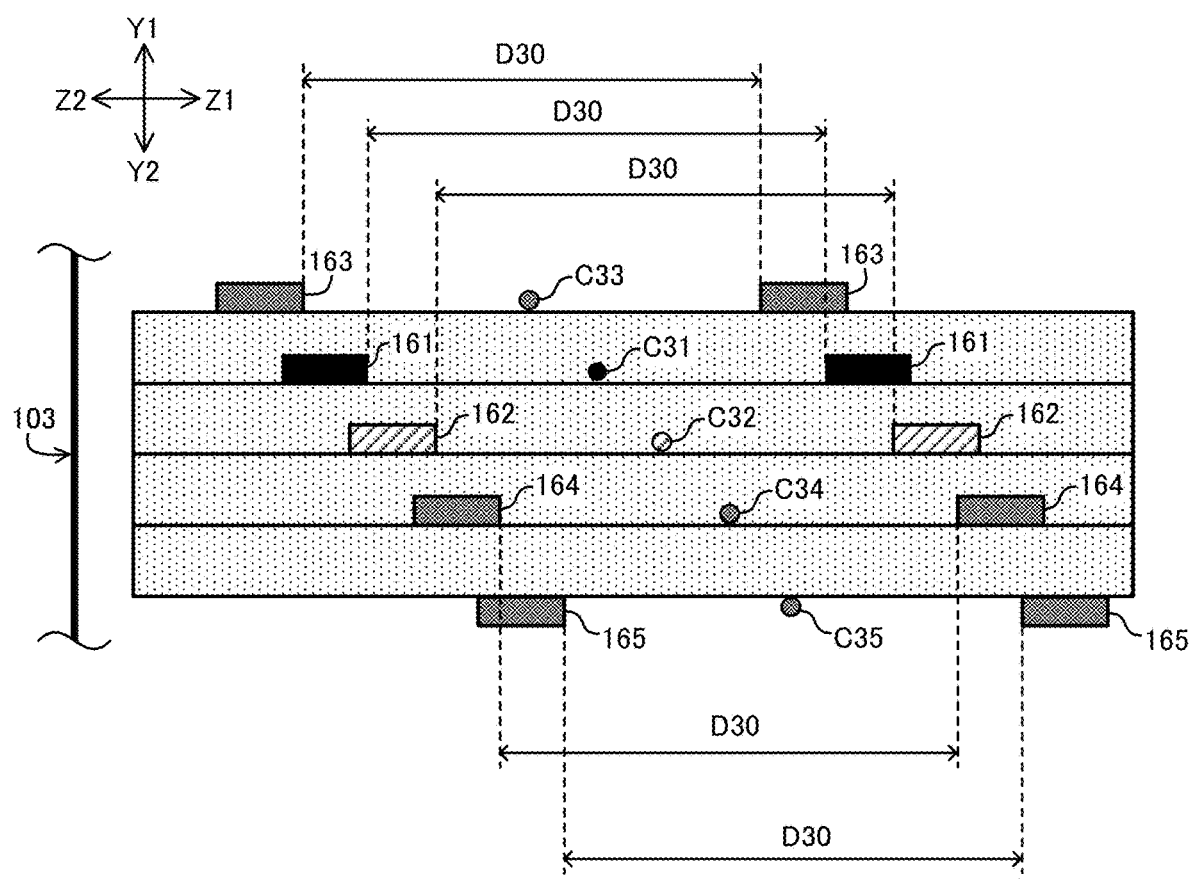
FIG. 14 is a schematic first cross-sectional view of a substrate in a modification.

The substrate 132 may be a multilayered substrate with the coil pattern 133 including coil patterns located on different conductor layers. FIG. 14 illustrates an example in which the coil pattern 133 includes the first coil pattern 161 and the second coil pattern 162 as well as a third coil pattern 163 located in the Y1 direction from the first coil pattern 161, and a fourth coil pattern 164 and a fifth coil pattern 165 located in the Y2 direction from the second coil pattern 162. Each coil pattern has the same distance D30 between the conductor adjacent to the exposed surface 103 and the opposite conductor. The center points C31 and C32, a center point C33 of the third coil pattern 163, a center point C34 of the fourth coil pattern 164, and a center point C35 of the fifth coil pattern 165 are closer to the exposed surface 103 in the order along the arrow Y1. In other words, the center points C31, C32, C33, C34, and C35 in the individual layers are closer to the exposed surface 103 in the stacking direction of the layers in the substrate 132.

Figure 15:
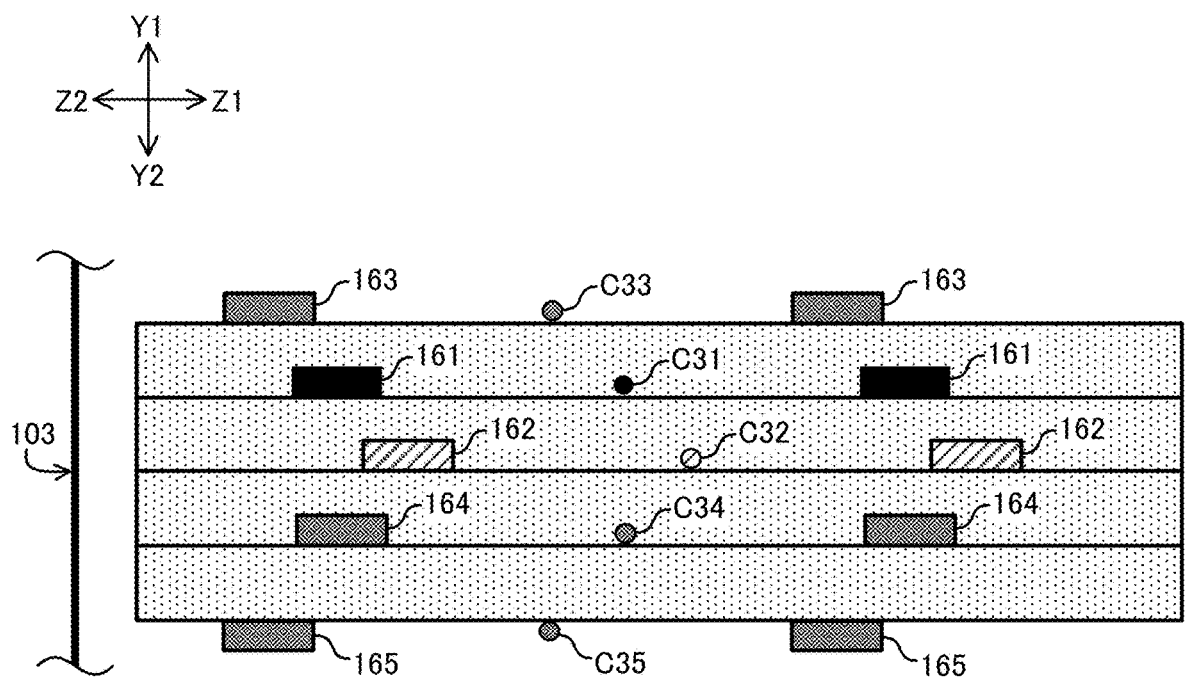
FIG. 15 is a second schematic cross-sectional view of a substrate in the modification.

The arrangement in FIG. 14 may further be modified as illustrated in FIG. 15. In the example in FIG. 15, the center point C33 is closer to the exposed surface 103 than the center point C31, the center point C34 is closer to the exposed surface 103 than the center point C32, and the center point C35 is closer to the exposed surface 103 than the center point C34.

Although the first coil pattern 161 and the second coil pattern 162 described above each include a single winding, at least one of the first coil pattern 161 or the second coil pattern 162 may include two or more windings.

Embodiment 4

Embodiment 4 is described focusing on the differences from Embodiment 1. Like reference signs denote like or corresponding components in Embodiment 1. The present embodiment differs from Embodiment 1 in that the coil patterns in the coil pattern 133 have conductors adjacent to the exposed surface 103 on the same surface of the substrate 132 and the opposite conductors on different layers.

Figure 16:
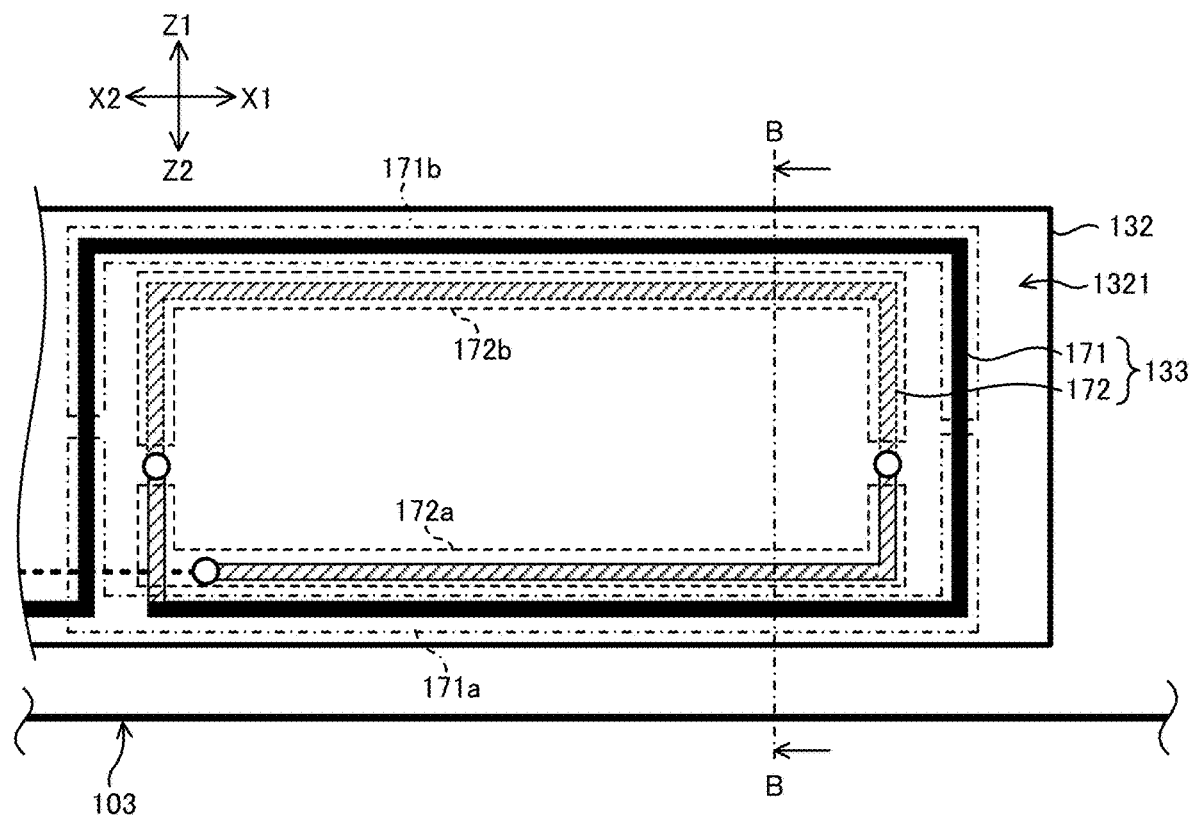
FIG. 16 is a diagram illustrating a coil pattern in Embodiment 4.

As illustrated in FIG. 16, the coil pattern 133 includes a first coil pattern 171 indicated by a solid area and a second coil pattern 172 indicated by a hatched area. The first coil pattern 171 and the second coil pattern 172 each include a single winding, and the coil pattern 133 corresponds to a coil with two windings.

The first coil pattern 171 includes a first conductor 171a adjacent to the exposed surface 103 and a second conductor 171b opposite to the exposed surface 103 across the first conductor 171a. The first conductor 171a and the second conductor 171b are both located on the surface 1321 that is the front surface of the substrate 132. The second coil pattern 172 includes a third conductor 172a adjacent to the exposed surface 103 and a fourth conductor 172b opposite to the exposed surface 103 across the third conductor 172a. The third conductor 172a is located on the surface 1321 in the same manner as the first coil pattern 171, whereas the fourth conductor 172b is located on the rear surface of the substrate 132. The third conductor 172a and the fourth conductor 172b are electrically connected to each other with conductors indicated by outlined circles in FIG. 16.

Figure 17:
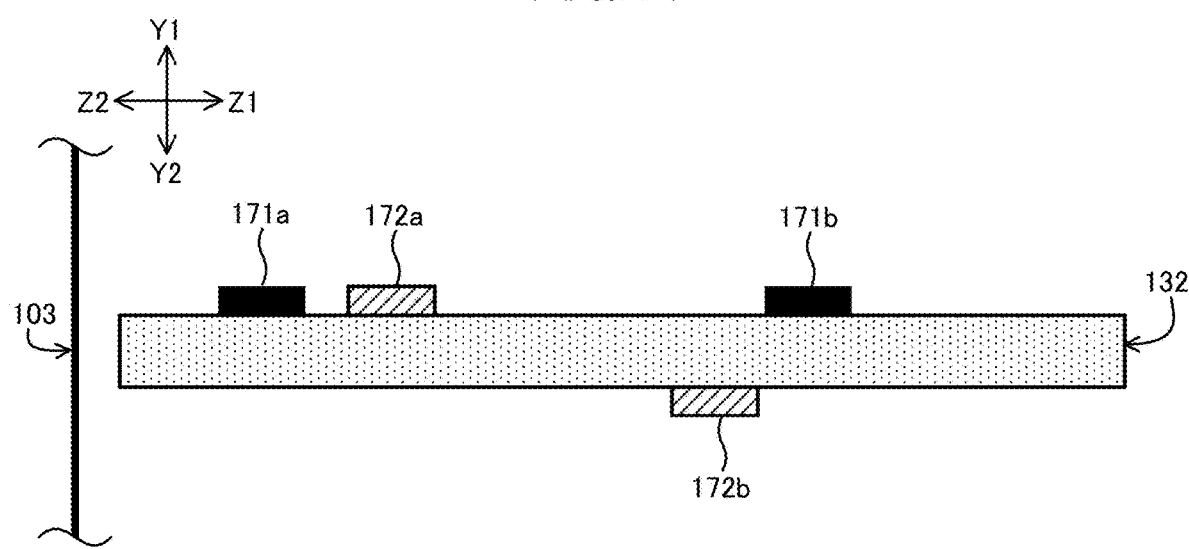
FIG. 17 is a schematic cross-sectional view of a substrate in Embodiment 4.

FIG. 17 is a schematic cross-sectional view of the substrate 132 taken along line B-B. As illustrated in FIG. 17, the first conductor 171a and the second conductor 171b in the first coil pattern 171 are both located on the conductor layer at the front surface of the substrate 132. The third conductor 172a in the second coil pattern 172 is located on the conductor layer at the front surface of the substrate 132, whereas the fourth conductor 172b is located on the conductor layer at the rear surface of the substrate 132.

The communication device 100 including the substrate 132 according to the present embodiment is expected to have a greater magnetic flux density value at a position adjacent to the exposed surface 103 within the magnetic field produced by the coil pattern 133, thus improving the efficiency of communication. In particular, the first conductor 171a and the third conductor 172a may be proximate to each other, and the second conductor 171b and the fourth conductor 172b may overlap each other in the plane X-Z.

Although the angle θ described above is 90 degrees, the angle θ may be changed as in the above embodiment.

The substrate 132 may be a multilayered substrate with the coil pattern 133 including more than two coil patterns partially located on different layers. In the example in FIG. 18, the first conductor 171a and the third conductor 172a as well as a fifth conductor 173a, a seventh conductor 174a, and a ninth conductor 175a are located adjacent to the exposed surface 103 on the same conductor layer. The second conductor 171b, the fourth conductor 172b, a sixth conductor 173b included in a third coil pattern with the fifth conductor 173a, an eighth conductor 174b included in a fourth coil pattern with the seventh conductor 174a, and a tenth conductor 175b included in a fifth coil pattern with the ninth conductor 175a are located in the Z1 direction along the Y-axis. The substrate 132 with this structure may also improve the efficiency of communication. The example in FIG. 18 corresponds to another example of a modification with a typical cylindrical coil bent as illustrated in FIG. 15.

Although the first coil pattern 171 and the second coil pattern 172 described above each include a single winding, at least one of the first coil pattern 171 or the second coil pattern 172 may include two or more windings.

Figure 18:
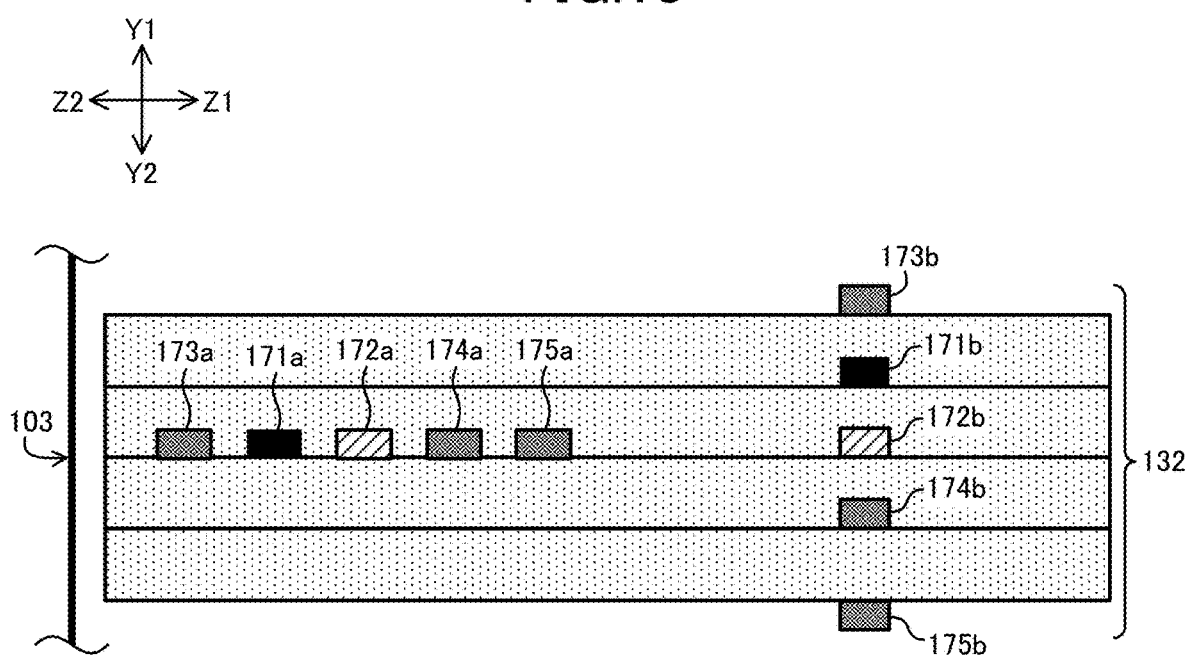
FIG. 18 is a schematic third cross-sectional view of a substrate in the modification.
Figure 19:
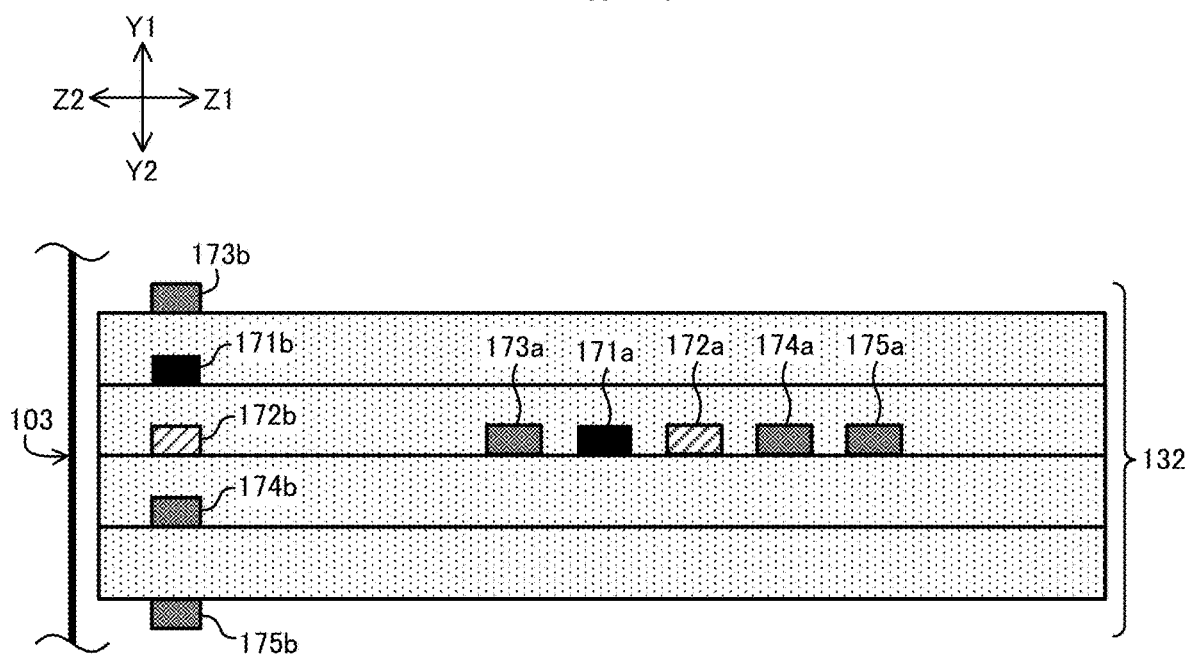
FIG. 19 is a schematic fourth cross-sectional view of a substrate in the modification.

The conductors located in the Z1 direction and the conductors located in the Z2 direction illustrated in FIG. 18 may be replaced with each other. As illustrated in FIG. 19, the conductors on multiple layers may be located near the exposed surface 103 to produce a magnetic field more uniform at a position adjacent to the exposed surface 103 than at the opposite position, improving the stability of communication with the external device 300. More specifically, the substrate 132 may have coil patterns symmetric with respect to the X-axis in FIGS. 16 to 18. The magnetic flux density is affected by various parameters including coil patterns, the distance between the substrate 132 and the exposed surface 103, materials for the communication device 100 and the equipment 200, the orientation of the substrate 132, and other factors. The coil patterns to be included in the communication device 100 may thus be determined after examination of the efficiency and stability of communication.

The coil pattern located on the substrate 132 includes the first coil pattern and the second coil pattern. Each of the first coil pattern and the second coil pattern includes at least one winding. The first coil pattern includes a first conductor located in a first direction and a second conductor located in a second direction. The first direction is one of an outward direction, or the Z2 direction, in which the exposed surface faces or a direction, or the Z1 direction, in which the body 101 is placed. The second direction is the other of the directions. The second coil pattern includes a third conductor located in the first direction and a fourth conductor located in the second direction. The first conductor and the third conductor are located on the same surface of the substrate, whereas the second conductor and the fourth conductor are located on different layers in the substrate.

Embodiment 5

Embodiment 5 is described focusing on the differences from Embodiment 1. Like reference signs denote like or corresponding components in Embodiment 1. The present embodiment differs from Embodiment 1 in that some of the conductors in the coil pattern 133 are connected in parallel.

Figure 20:
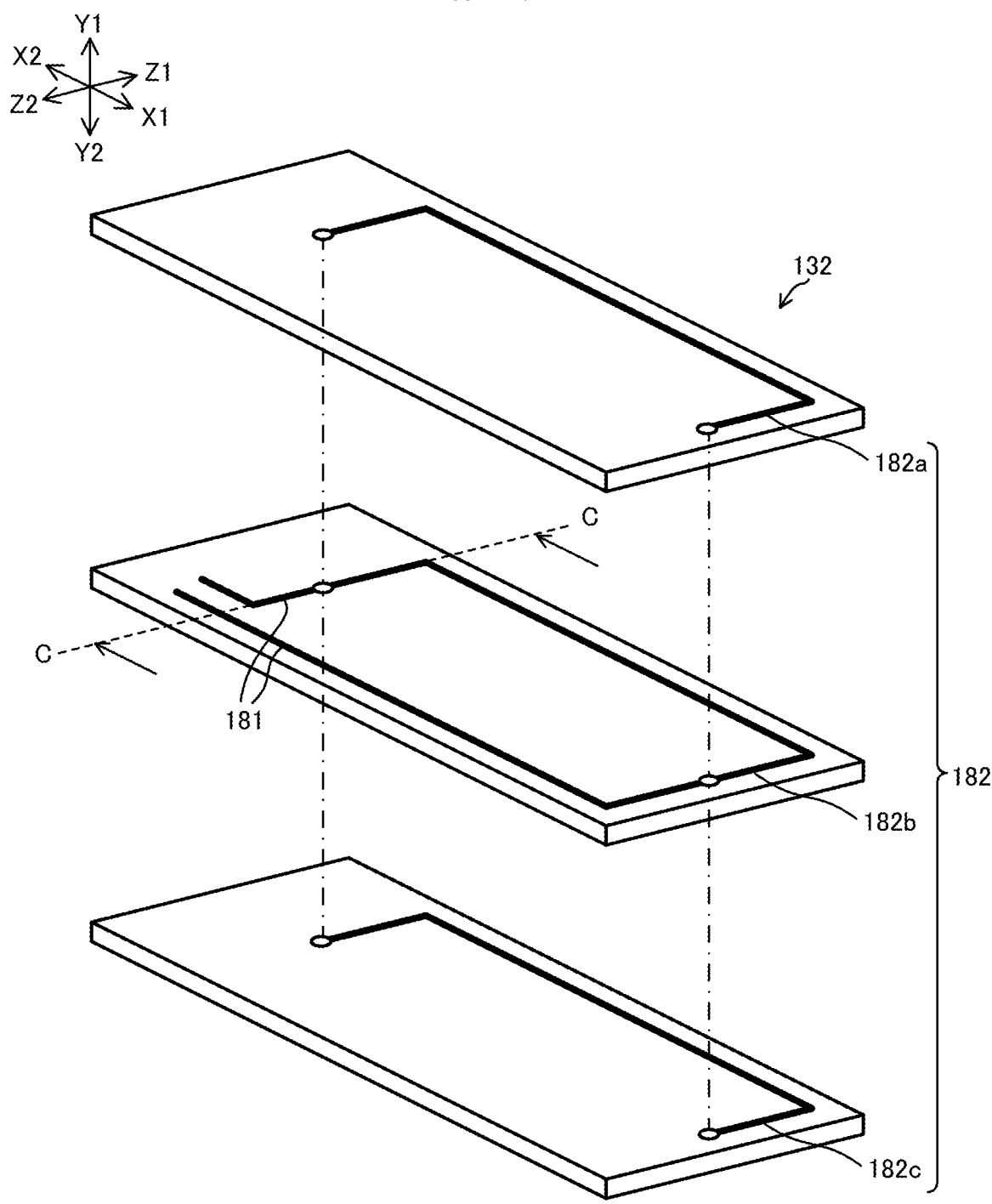
FIG. 20 is a diagram illustrating a coil pattern in Embodiment 5.

As illustrated in FIG. 20, the coil pattern 133 includes a first conductor 181 located in the Z2 direction, or adjacent to the exposed surface 103, and a conductor 182 located in the Z1 direction, or opposite to the exposed surface 103 across the first conductor 181. The conductor 182 includes a second conductor 182a, a third conductor 182b, and a fourth conductor 182c located on different layers. The second conductor 182a, the third conductor 182b, and the fourth conductor 182c are electrically connected parallel to the first conductor 181 with a through-hole conductor or a via conductor.

Figure 21:
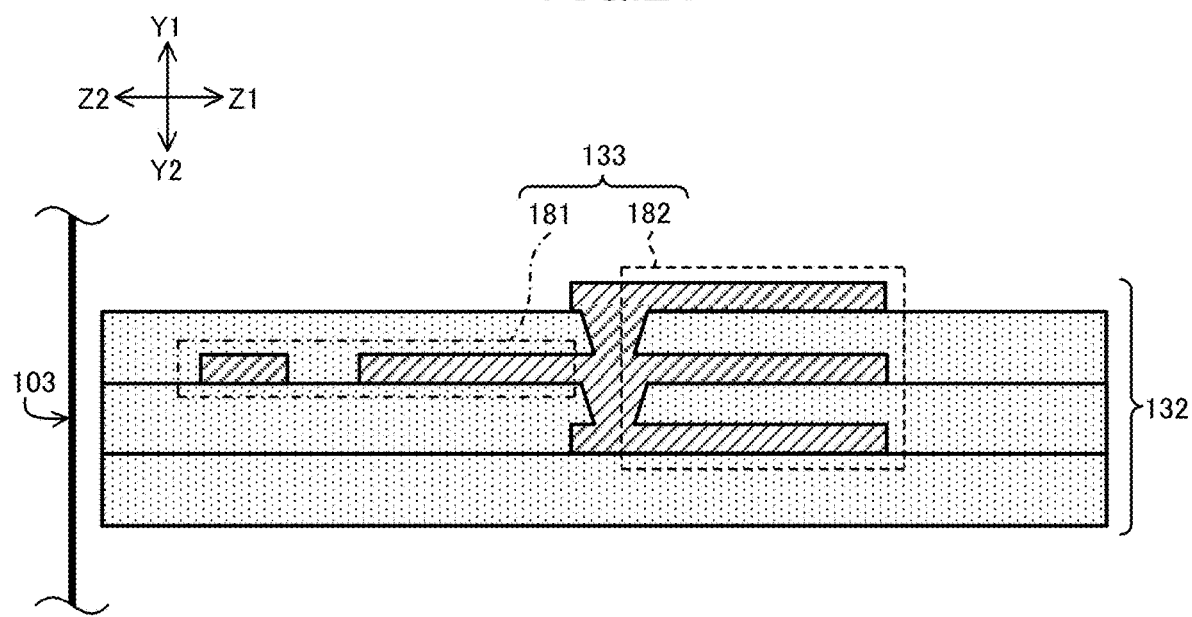
FIG. 21 is a schematic cross-sectional view of a substrate in Embodiment 5.

FIG. 21 is a schematic cross-sectional view of the substrate 132 taken along line C-C. In the example in FIG. 21, the conductor 182 in the coil pattern 133 electrically connects different conductor layers with a via conductor.

The communication device 100 including the substrate 132 according to the present embodiment is expected to have a greater magnetic flux density value at a position adjacent to the exposed surface 103 within the magnetic field produced by the coil pattern 133, thus improving the efficiency of communication.

Although the conductor 182 in the coil pattern 133 described above has conductor patterns located on three different layers, the conductor patterns in the conductor 182 may be located on two or more than three layers. In particular, when the conductor patterns in the conductor 182 is located on five layers, the conductor patterns corresponds to a modified example of a single conductor pattern collectively including the first conductor 171a, the third conductor 172a, the fifth conductor 173a, the seventh conductor 174a, and the ninth conductor 175a illustrated in FIG. 18.

Although the coil pattern 133 described above includes a single winding, the coil pattern 133 may include two or more windings.

Figure 22:
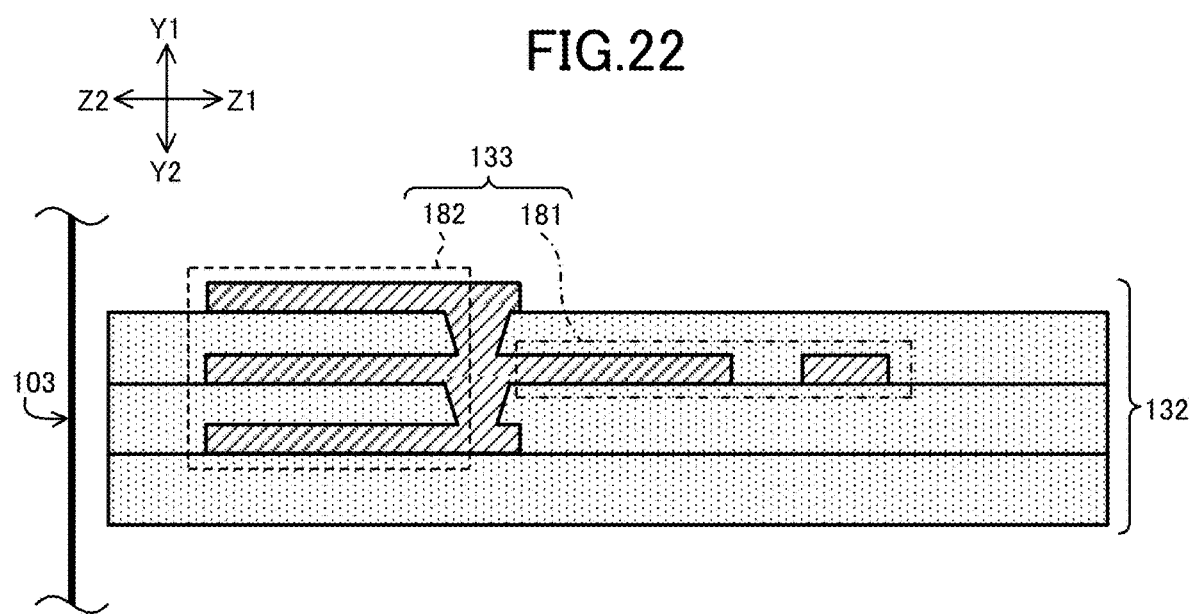
FIG. 22 is a schematic fifth cross-sectional view of a substrate in the modification.

The conductor located in the Z1 direction and the conductor located in the Z2 direction illustrated in FIG. 21 may be replaced with each other. As illustrated in FIG. 22, the conductors on multiple layers may be located near the exposed surface 103 to produce a magnetic field more uniform at a position adjacent to the exposed surface 103 than at the opposite position, improving the stability of communication with the external device 300. More specifically, the substrate 132 may have coil patterns symmetric with respect to the X-axis in FIGS. 20 and 21. The magnetic flux density is affected by various parameters, and the coil patterns to be included in the communication device 100 may thus be determined after examination of the relationship between the parameters and the shape of the coil pattern, and the efficiency and stability of communication.

The coil pattern includes a first conductor located in a first direction and a second conductor and a third conductor located in a second direction and connected parallel to the first conductor. The first direction is one of an outward direction, or the Z2 direction, in which the exposed surface 103 faces or a direction, or the Z1 direction, in which the body 101 is placed. The second conductor and the third conductor are located on different layers in the substrate.

Although one or more embodiments of the present disclosure have been described above, the present disclosure is not limited to the above embodiments.

For example, although the communication device 100 described above is substantially the same as the body 101, the communication device 100 may include components different from the attachments 102 in addition to the body 101.

Figure 23:
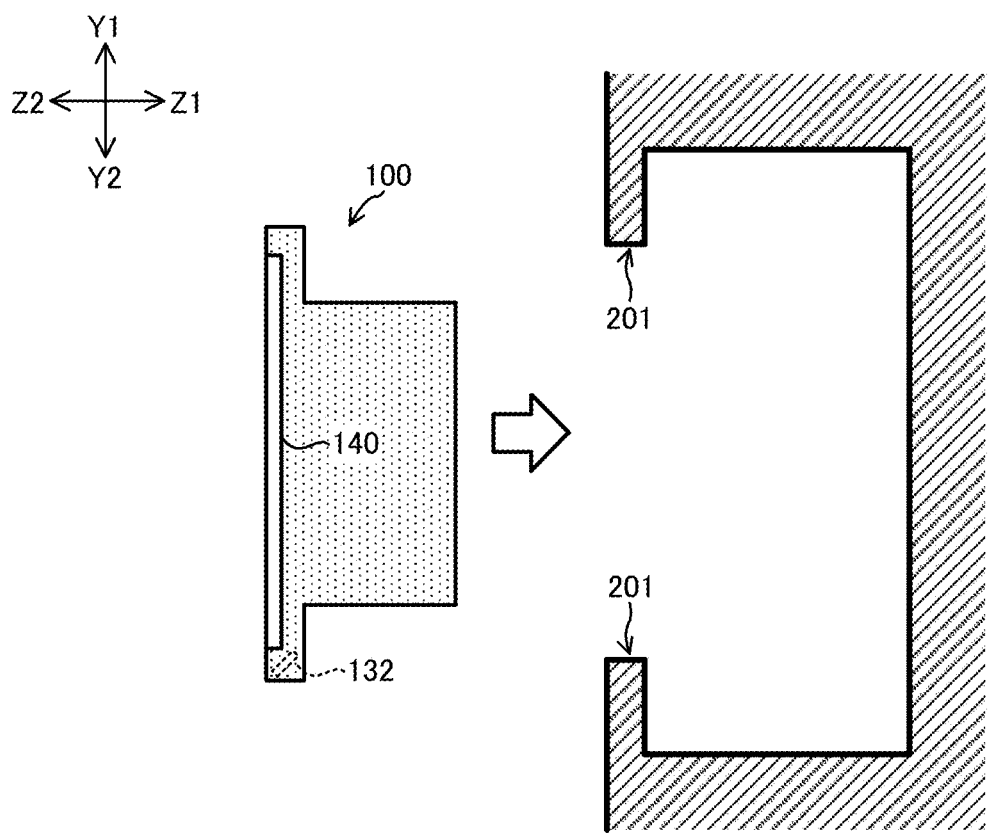
FIG. 23 is a diagram of a communication device according to a modification.

The communication device 100 may have any shape other than a rectangular shape. For example, as illustrated in FIG. 23, the body 101 of the communication device 100 may include a screen unit 105 with a display screen larger than the opening 201 as viewed from the operator located in the Z2 direction. In this example, when the communication device 100 is placed in the opening 201 in the equipment 200 and installed, the substrate 132 located inside a frame surrounding the display screen of the screen unit 105 achieves short-range wireless communication.

Although the communication device 100 described above is a display, for example, the communication device 100 may be a speaker or a storage installed in the equipment 200 that is a control panel. The equipment 200 may not be a control panel. For example, the equipment 200 may be a wall of a building constructed from a material such as concrete, timber, or metal. The equipment 200 is to have the wall surface 203 to which the communication device 100 is fixed, and the communication device 100 may be fitted into a recess in the wall surface 203.

Although the communication device 100 described above is being screwed to the equipment 200 with the attachments 102, the communication device 100 may be installed in the equipment 200 in any other manner. For example, the communication device 100 may not include the attachments 102. More specifically, attachments may be located on the wall surface 203 or in the opening 201 to fix the rectangular body 101 placed in the opening 201 by pressing or holding the body 101 with the attachments. The communication device 100 may be fixed in the opening 201 with a magnet located at the bottom of the opening 201 attracting a steel plate included in the housing of the body 101.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

One or more embodiments of the present disclosure is applicable to a device fixed to a wall surface for short-range wireless communication.

REFERENCE SIGNS LIST

100 Communication device
101 Body
102 Attachment
103 Exposed surface
104 Display screen
105 Screen unit
110 Controller
120 Device communicator
130 Wireless communicator
131 Communication circuit
132, 132a Substrate
1321 Surface
133 Coil pattern
140 Display
151, 161, 171 First coil pattern
151a, 171a, 181 First conductor
151b, 171b, 182a Second conductor
152, 162, 172 Second coil pattern
152a, 172a, 182b Third conductor
152b, 172b, 182c Fourth conductor
163 Third coil pattern
163a Electrical conductor
164 Fourth coil pattern
165 Fifth coil pattern
173a Fifth conductor
173b Sixth conductor
174a Seventh conductor
174b Eighth conductor
175a Ninth conductor
175b Tenth conductor
182 Conductor
200 Equipment
201 Opening
202 Hole
300 External device
C21, C22, C31, C32, C33, C34, C35 Center point
D1, D2 Width
D11, D12, D21, D22, D30, D31, D32 Distance
θ Angle

The invention claimed is:
1. A communication device, comprising:
a body; and
wireless communication circuitry housed in the body and configured to communicate wirelessly with an external device proximate to the body through magnetic coupling,
wherein the body is placed in an opening in a wall surface and fixed to the wall surface with an exposed surface of the body exposed from the wall surface,
the wireless communication circuitry includes a substrate including a coil to allow the magnetic coupling with the external device,
the substrate is nonparallel to the exposed surface,
the communication device further comprises a display configured to display an image on a screen thereof within the exposed surface, and
the substrate is located inside a frame surrounding the screen.

2. The communication device according to claim 1, wherein the substrate is perpendicular to the exposed surface.

3. The communication device according to claim 1, wherein
the coil pattern includes a first coil pattern and a second coil pattern, and
the first coil pattern is located on a front surface of the substrate, the second coil pattern is located on a rear surface of the substrate that is opposite the front surface.

4. The communication device according to claim 3, wherein the first coil pattern and the second coil pattern are electrically connected through a conductor in the substrate.

5. The communication device according to claim 1, wherein the coil pattern includes a first coil pattern and a second coil pattern, the first coil pattern has a first center point, the second coil pattern has a second center point, and the second center point is closer to the exposed surface than the first center point.

6. The communication device according to claim 1, further comprising a controller configured to display a message on the display to prompt an operator to adjust a position or orientation of the external device when a central axis of a coil in the external device is aligned with the substrate.

7. A communication device, comprising:
a body; and
wireless communication circuitry housed in the body configured to communicate wirelessly with an external device proximate to the body through magnetic coupling,
wherein the body is placed in an opening in a wall surface and fixed to the wall surface with an exposed surface of the body exposed from the wall surface,
the wireless communication circuitry includes a substrate including a coil pattern to allow the magnetic coupling with the external device,
the substrate is nonparallel to the exposed surface,
the coil pattern includes a first coil pattern and a second coil pattern, and each of the first coil pattern and the second coil pattern includes at least one winding,
the first coil pattern includes a first conductor located in a first direction and a second conductor located in a second direction, the first direction is one of an outward direction in which the exposed surface faces or a direction in which the body is placed, and the second direction is the other of the directions,
the second coil pattern includes a third conductor located in the first direction and a fourth conductor located in the second direction,
the first conductor and the third conductor are located on one surface of the substrate, and
the second conductor and the fourth conductor are located on different layers in the substrate.

8. The communication device according to claim 7, wherein
the substrate and the exposed surface form an angle of 60 degrees or more.

9. The communication device according to claim 7, wherein the substrate is perpendicular to the exposed surface.

10. A communication device, comprising:

a body; and wireless communication circuitry housed in the body configured to communicate wirelessly with an external device proximate to the body through magnetic coupling, wherein the body is placed in an opening in a wall surface and fixed to the wall surface with an exposed surface of the body exposed from the wall surface, the wireless communication circuitry includes a substrate including a coil pattern to allow the magnetic coupling with the external device, the substrate is nonparallel to the exposed surface, the coil pattern includes a first conductor located in a first direction and a second conductor and a third conductor located in a second direction and connected parallel to the first conductor, the first direction is one of an outward direction in which the exposed surface faces or a direction in which the body is placed, and the second direction is the other of the directions, and the second conductor and the third conductor are located on different layers in the substrate.

11. The communication device according to claim 10, wherein the substrate is perpendicular to the exposed surface.

* * * * *